UNITED STATES PATENT OFFICE.

JULIUS KIRCHER, OF BROOKLYN, NEW YORK, ASSIGNOR OF THREE-FIFTHS OF HIS INTEREST TO BENNO LOEWY, OF NEW YORK CITY.

MANUFACTURE OF PRINTING-INK.

SPECIFICATION forming part of Reissued Letters Patent No. 9,126, dated March 23, 1880.

Original No. 223,363, dated January 6, 1880. Application for reissue filed January 21, 1880.

*To all whom it may concern:*

Be it known that I, JULIUS KIRCHER, of Brooklyn, Kings county, and State of New York, have invented a new and Improved Printing-Ink, of which the following is a specification.

My invention relates to the printing or preparation of postage-stamps and other stamps, checks, bonds, &c., and has for its object to prevent the washing, reuse, or alteration of said stamps, checks, bonds, &c.

My invention consists in preventing the fiber of paper or other material to be printed upon from taking color, printing the stamps with a deleble ink—that is, with an ink which will not unite intimately with the fiber of the paper, and which will be soluble in the liquids usually employed for washing the stamps, or will combine with any substance used for that purpose.

My invention consists, further, in a composition of ink which will effect the purposes just named.

To make an ink fit for printing purposes, and at the same time deleble, I have discovered that certain conditions are requisite: first, that the completed substance must not be of a nature which will dry too rapidly; secondly, that the substance must contain an ingredient which, covering or protecting the paper or material to be printed upon, will prevent the coloring-matter or pigment of the ink from uniting intimately therewith.

When the second condition is fulfilled the coloring-matter rests upon the surface of the paper or material printed upon, and this coloring-matter and its solvent, having been mixed with a suitable resin, this resin acts to protect the ink from the atmosphere and other destructive influences.

To carry my invention into effect I dissolve about ten (10) parts, by weight, of any suitable resin, such as rosin, gum-dammar, olibanum, mastic, benzoin, or copal, with ten (10) to fifteen (15) parts of oil of turpentine, benzine, copaiba-balsam, or other ethereal or essential oil at a moderate temperature. I may, however, slightly vary these proportions, using more or less of either.

When complete solution has taken place I add one (1) part, by weight, or a little more, of linseed-oil or other drying-oil, such as poppy-oil, to unite with the resin, and to this I then add one part, or a little more, of olive-oil or other non-drying oil, such as oleine, palm-oil, cocoa-oil, tallow, butter, fat, or the like, to unite with the fiber. The mass is then slightly heated, and any suitable pigment desired is added in quantities according to the depth of color wished, the kind and quality of the pigment used, and the proportions of the ink employed—say from ten (10) to twenty (20) parts, by weight.

Since my invention consists, mainly, in producing an ink with which to print postal or revenue stamps, money-checks, and similar articles, which will sooner be destroyed or affected than any writing or canceling-mark upon the check or stamp, it is obvious that I am not limited to the exact proportions given for producing the ink, the main essential being that the coloring-matter, while sufficiently fast for all legitimate purposes, should rest upon the body of the stamp in such manner that when it is attempted to wash the stamp with any substance to remove the canceling-mark—such as soap and water, soda, an alkali, ether, alcohol, or other substance employed to wash stamps for reuse—it will be effaced. It is obvious, therefore, that the ink might be prepared without the quantity of the non-drying or fatty oil, in which case the oil should be previously placed upon the paper or material to be printed upon, or the same be charged therewith.

Another reason why the proportions may and should be varied is, that different kinds or qualities of paper or material to be printed upon and different modes or varieties of printing may demand a different kind or quality or a different consistence of ink.

Although I have shown that certain ingredients of this ink may be used separately, I prefer to use the ink described as an entirety.

Having thus described my invention, what I desire to claim and secure by Letters Patent is—

1. The method of preventing the recovery, alteration, or reuse of postage-stamps, revenue-stamps, checks, bonds, &c., which have been already used, which consists in saturating the body of the material of which the stamp, check, or bond, &c., is composed with an oleaginous protective substance, and printing the stamp or other figure or design thereon.

2. The method of preventing the recovery, alteration, or reuse of postage and other stamps, bonds, checks, &c., which have been already used, which consists in producing the figure or design upon the paper or material printed upon and treated with an oleaginous substance, either separate from or contained in the ink, by means of a deleble ink, as set forth, whereby any attempt to efface the cancellation-mark will spoil the stamp.

3. A printing-ink consisting of a suitable resin, such as rosin, dissolved in an ethereal or essential oil, such as oil of turpentine, a drying-oil, as linseed or poppy oil, and a non-drying or fatty oil, such as olive-oil, to protect the fabric, and a suitable pigment, substantially as and for the purpose set forth.

4. The herein-described printing-ink, consisting of ten (10) parts, by weight, of rosin, ten (10) to fifteen (15) parts of oil of turpentine, one (1) part linseed-oil, one (1) part of olive-oil, and ten (10) to twenty (20) parts of a suitable pigment, substantially as and for the purposes set forth.

JULIUS KIRCHER.

Witnesses:
WM. J. LEITCH,
MOSES LEVY.